ized Patent No.: US 7,468,734 B2

United States Patent
Yamasaki

(10) Patent No.: US 7,468,734 B2
(45) Date of Patent: Dec. 23, 2008

(54) APPARATUS FOR AND METHOD OF GRAPHIC PROCESSING AND COMPUTER-READABLE PROGRAM

(75) Inventor: Toshiyuki Yamasaki, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 332 days.

(21) Appl. No.: 10/997,910

(22) Filed: Nov. 29, 2004

(65) Prior Publication Data
US 2005/0134590 A1    Jun. 23, 2005

(30) Foreign Application Priority Data
Dec. 19, 2003    (JP)    ............................ 2003-422977

(51) Int. Cl.
G09G 5/00    (2006.01)
(52) U.S. Cl. ...................................... 345/619; 382/259
(58) Field of Classification Search ................. 345/619; 348/190, 203
See application file for complete search history.

(56) References Cited

U.S. PATENT DOCUMENTS

| 5,457,755 | A | * | 10/1995 | Ishida et al. ................. 382/324 |
| 5,881,170 | A |   | 3/1999 | Araki et al. |
| 6,069,637 | A | * | 5/2000 | Gaglione et al. ............. 345/629 |
| 6,125,374 | A | * | 9/2000 | Terry et al. .................. 715/502 |
| 6,266,444 | B1 |   | 7/2001 | Yoshida |
| 6,453,069 | B1 | * | 9/2002 | Matsugu et al. ............. 382/173 |
| 6,760,638 | B1 | * | 7/2004 | Love et al. .................... 700/98 |
| 6,882,892 | B2 | * | 4/2005 | Farrah et al. .................. 700/97 |
| 6,937,765 | B2 | * | 8/2005 | Skourikhine et al. ........ 382/199 |
| 7,076,099 | B2 | * | 7/2006 | Kondo et al. ................ 382/203 |

FOREIGN PATENT DOCUMENTS

| CN | 1038878 A | 1/1990 |
| JP | 04-317185 | 11/1992 |
| JP | 05-282389 | 10/1993 |
| JP | 06-119446 | 4/1994 |

OTHER PUBLICATIONS

Chinese Office Action issued in corresponding Chinese Patent Application No. CN 200410095074.4 dated Feb. 9, 2007.
Japanese Office Action, w/ English translation thereof, issued in Patent Application No. JP 2003-422977 dated on Sep. 9, 2008.

* cited by examiner

*Primary Examiner*—M Good Johnson
(74) *Attorney, Agent, or Firm*—McDermott Will & Emery LLP

(57) ABSTRACT

A graphic processing apparatus makes a scan of graphic primitives of a target graphic object to search for an outermost closed figure, and displays the scanned graphic primitives, a search starting point, a turnaround point, and a region surrounded by the scanned graphic primitives and hatched for discernment from other regions. Thus, an operator can judge or not the outline of the target graphic object forms a closed figure. If the outline forms no closed figure, the operator can easily judge which graphic primitive is unconnected.

9 Claims, 8 Drawing Sheets

F I G . 4
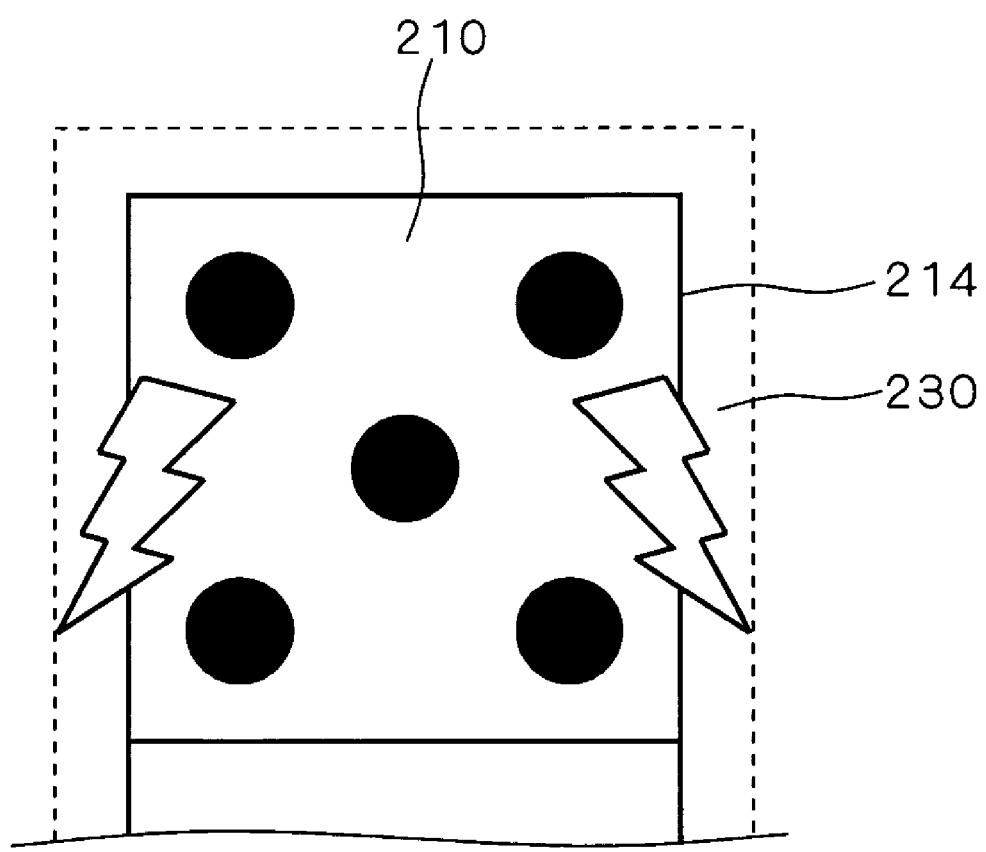

F I G . 7
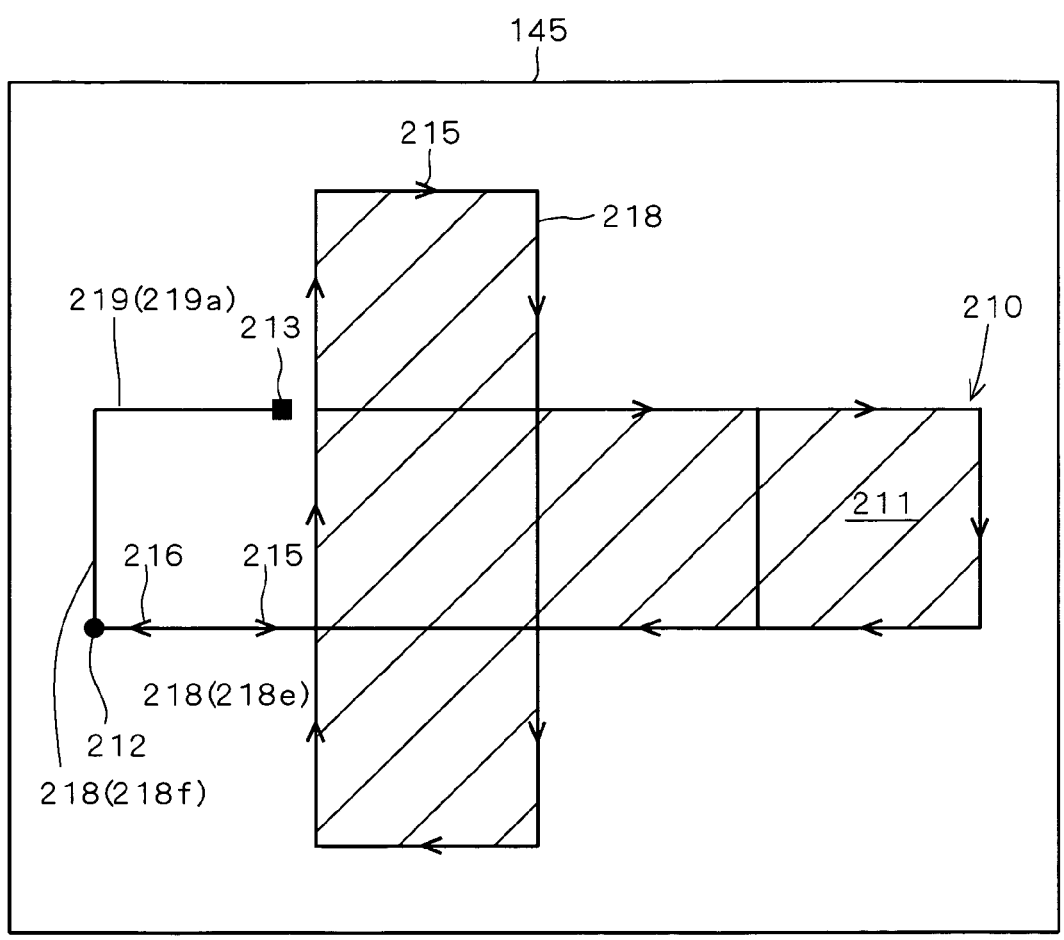

APPARATUS FOR AND METHOD OF GRAPHIC PROCESSING AND COMPUTER-READABLE PROGRAM

BACKGROUND OF THE INVENTION

1. Field of the Invention

The present invention relates to a graphic processing apparatus, a graphic processing method and a program for performing predetermined graphic processing on a target graphic object including a plurality of graphic primitives specified by graphic data. More particularly, the present invention relates to an improvement for facilitating a judgment as to whether or not the graphic primitives constituting the outermost perimeter of the target graphic object are connected to each other.

2. Description of the Background Art

A graphic processing apparatus for recognition of a closed graphic portion from a target graphic object composed of a plurality of line segment data has conventionally been known. In this graphic processing apparatus, a portion other than the outline of the target graphic object is recognized as a closed graphic portion if the line segment data constituting the outline of the target graphic object are not properly connected to each other, that is, if the outline of the target graphic object does not form a closed figure but forms an open figure.

To create the outline of the target graphic object which forms a closed figure in this case, an operator of the graphic processing apparatus must find out an unconnected portion and perform a correction process for proper connection of that portion.

There are, however, some cases where such an unconnected portion exists in terms of graphic data although the line segments of the outline appear to be connected to each other as far as the operator of the graphic processing apparatus observes the target graphic object displayed on a display device. In such cases, it is very difficult for the operator to locate the unconnected portion. This causes the reduction in efficiency of graphic processing.

SUMMARY OF THE INVENTION

The present invention is intended for a graphic processing apparatus for performing a predetermined process on a target graphic object composed of a plurality of graphic primitives.

According to the present invention, the graphic processing apparatus comprises: an input element for inputting the target graphic object; an extraction element for searching the target graphic object for a graphic primitive forming an outermost closed figure to extract the graphic primitive from the target graphic object; and a display element for displaying the graphic primitive extracted from the target graphic object by the extraction element discernibly from other graphic primitives, wherein the plurality of graphic primitives are specified by graphic data.

The graphic processing apparatus is capable of easily detecting the graphic primitive which appears to be properly connected as far as an operator observes but is unconnected in terms of the graphic data. This significantly reduces the time required for the operator to search for an unconnected portion.

Preferably, the display element displays a region of the target graphic object surrounded by the outermost closed figure discernibly from other regions.

The graphic processing apparatus allows the operator to easily detect which portion of the outermost perimeter of the target graphic object is not properly connected.

The present invention is also intended for a graphic processing apparatus for placing a plurality of target graphic objects each composed of a plurality of graphic primitives within a printable region and for creating a mask corresponding to each of the target graphic objects.

According to the present invention, the graphic processing apparatus comprises: an input element for inputting the plurality of target graphic objects; an extraction element for searching a selected one of the plurality of target graphic objects for a graphic primitive forming an outermost closed figure to extract the graphic primitive from the selected target graphic object; and a display element for displaying the graphic primitive extracted from the selected target graphic object by the extraction element discernibly from other graphic primitives, wherein the plurality of graphic primitives are specified by graphic data.

The graphic processing apparatus is capable of easily detecting the graphic primitive which appears to be properly connected as far as an operator observes but is unconnected in terms of the graphic data. This significantly reduces the time required for the operator to search for an unconnected portion.

The present invention is also intended for a computer-readable program.

According to the present invention, the program is read by a computer to cause the computer to perform the steps of: (a) inputting a target graphic object composed of a plurality of graphic primitives to store the target graphic object in a storage part of the computer; (b) searching the target graphic object stored in the storage part for a graphic primitive forming an outermost closed figure to extract the graphic primitive from the target graphic object by means of a computation part of the computer; and (c) displaying on a display part the graphic primitive extracted from the target graphic object in the step (b) discernibly from other graphic primitives, wherein the plurality of graphic primitives are specified by graphic data.

This significantly reduces the time required for the operator to search for an unconnected portion.

The present invention is also intended for a method of performing a predetermined graphic process on a target graphic object composed of a plurality of graphic primitives.

According to the present invention, the method comprises the steps of: (a) inputting the target graphic object; (b) searching the target graphic object for a graphic primitive forming an outermost closed figure to extract the graphic primitive from the target graphic object; and (c) displaying the graphic primitive extracted from the target graphic object in the step (b) discernibly from other graphic primitives, wherein the plurality of graphic primitives are specified by graphic data.

This significantly reduces the time required for the operator to search for an unconnected portion.

It is therefore an object of the present invention to provide an apparatus for and method of graphic processing and a computer-readable program, which are capable of judging whether or not the outermost perimeter of a target graphic object is a closed figure and easily detecting an unconnected portion present on the outermost perimeter of the target graphic object.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows an example of a design;

FIGS. 6 through 8 illustrate the procedure for searching for the outermost closed figure.

DESCRIPTION OF THE PREFERRED EMBODIMENTS

A preferred embodiment according to the present invention will now be described in detail with reference to the drawings.

<1. Construction of Graphic Processing System>

Figure 1:
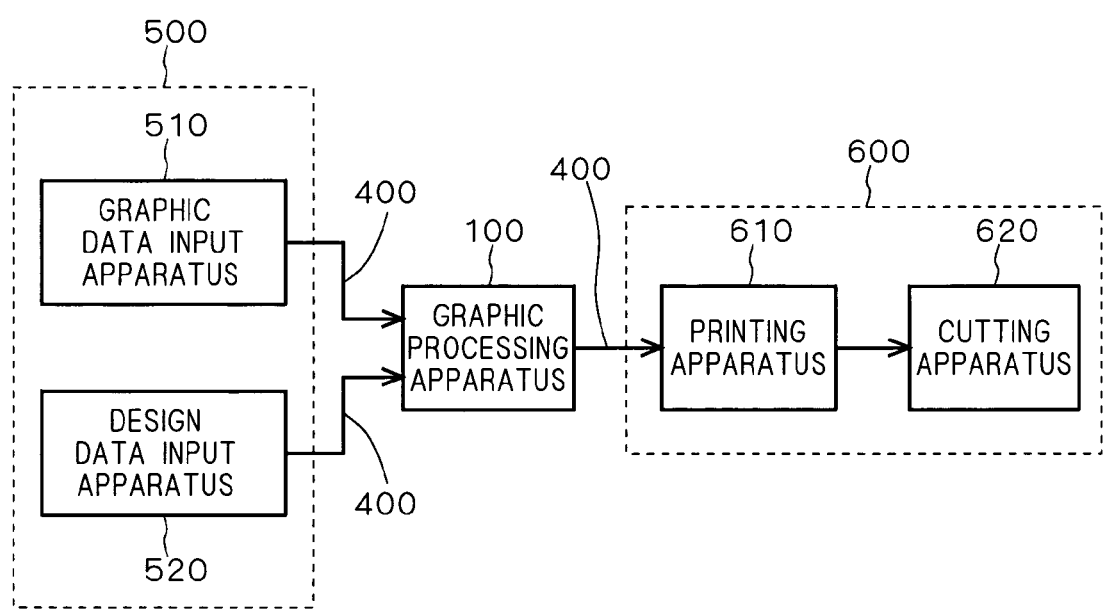
FIG. 1 is a diagram showing an example of the construction of a graphic processing system according to a preferred embodiment of the present invention.

FIG. 1 is a diagram showing an example of the construction of a graphic processing system 1 according to the preferred embodiment of the present invention. As shown in FIG. 1, the graphic processing system 1 principally comprises: a graphic processing apparatus 100; an input apparatus group 500 including a graphic data input apparatus 510 and a design data input apparatus 520 for providing input data to the graphic processing apparatus 100; an output apparatus group 600 including a printing apparatus 610 and a cutting apparatus 620 and for outputting a result of processing of the graphic processing apparatus 100; and a network 400 for connecting the apparatuses 100, 510, 520, 610 and 620 together.

An operator of the graphic processing apparatus 100 places various images and graphic primitives (e.g., lines and curves) in desired positions while viewing a screen, whereby the graphic processing apparatus 100 creates page layout data specifying the positions of the images and graphic primitives to be printed on a printing material (e.g., paper and plates).

The graphic processing apparatus 100 described in this preferred embodiment creates the page layout data about a plurality of developed drawings (or developments) of paper containers arranged within a printing area of a plate, the paper containers being made of paper for storage and packaging of commodity products. The present invention, however, is not limited to this. For example, the graphic processing apparatus 100 may create page layout data about a single target graphic object (e.g., a single developed drawing) placed within the printing area of the plate. The details of the hardware construction of the graphic processing apparatus 100 and the graphic processing in the graphic processing apparatus 100 will be described later.

The graphic data input apparatus 510 and the design data input apparatus 520 which constitute the input apparatus group 500 create respective input data to be placed on a plate in the graphic processing apparatus 100, and send the respective input data through the network 400 to the graphic processing apparatus 100.

The graphic data input apparatus 510 is an apparatus for creating CAD data 511 (see FIG. 3) about a plurality of arranged developed drawings 210 of paper containers, and is implemented by a personal computer or a workstation. Each of the developed drawings 210 created in the graphic data input apparatus 510 includes a plurality of line segments as graphic primitives. Each of the line segments constituting the developed drawings 210 has positional information about its starting point and its ending point. That is, each line segment as a graphic primitive can be identified using the positional information about its starting point and its ending point as a pair of graphic data. The CAD data 511 created in the graphic data input apparatus 510 are inputted through the network 400 to the graphic processing apparatus 100.

The design data input apparatus 520 is an apparatus for making designs including patterns, colors and the like to be put on the developed drawings 210 of the paper containers. Like the graphic data input apparatus 510, the design data input apparatus 520 is implemented by a personal computer or a workstation.

Painting software for manipulating and correcting graphics represented as a collection of points (e.g., dots or pixels), and drawing software for manipulating and correcting graphics created using lines are installed on the design data input apparatus 520. This enables the design data input apparatus 520 to create various design data. The design data created in the design data input apparatus 520 is inputted through the network 400 to the graphic processing apparatus 100.

The output apparatus group 600 includes the printing apparatus 610 for printing the plurality of developed drawings on a printing material (e.g., corrugated paper and paperboards) by using a plate made based on the page layout data created in the graphic processing apparatus 100, and a cutting apparatus 620 for cutting out the individual developed drawings printed on the printing material. Depending on the apparatus construction, the printing apparatus 610 may perform direct printing on the printing material based on the page layout data without using the plate.

<2. Construction of Graphic Processing Apparatus>

Figure 2:
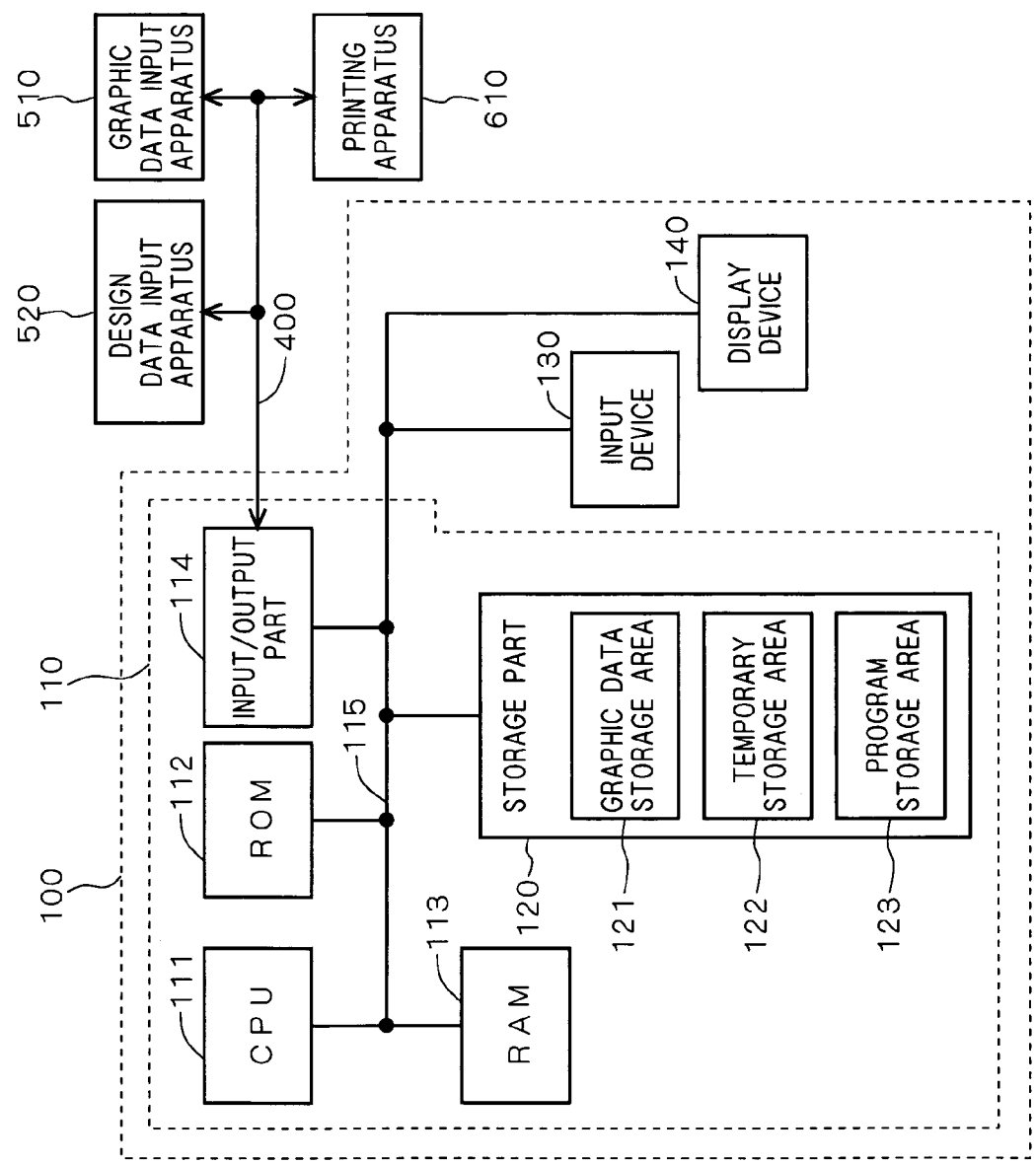
FIG. 2 is a diagram showing an example of the hardware construction of a graphic processing apparatus according to the preferred embodiment of the present invention.

FIG. 2 is a diagram showing an example of the hardware construction of the graphic processing apparatus 100. As mentioned above, the graphic processing apparatus 100 is an apparatus for creating the page layout data specifying the positions of the images and graphic primitives to be printed on the printing material. Like the graphic data input apparatus 510 and the design data input apparatus 520, the graphic processing apparatus 100 is implemented by a personal computer or a workstation. As shown in FIG. 2, the graphic processing apparatus 100 principally comprises: a controller 110; an input device 130 for inputting instructions given by the operator of the graphic processing apparatus 100; and a display device 140 for displaying the CAD data and the design data and for displaying results of graphic processing.

The input device 130 includes a mouse, a keyboard, and the like (not shown). The operator performs manipulations in accordance with descriptions or information displayed on a display screen 145 (see FIG. 3) of the display device 140 by the use of the mouse and the keyboard, thereby to cause the graphic processing apparatus 100 to execute a predetermined process.

The controller 110 principally comprises a CPU 111, a ROM 112, a RAM 113, a storage part 120, and an input/output part 114 for performing the process of transferring and receiving data to and from the graphic data input apparatus 510, the design data input apparatus 520 and the printing apparatus 610. As shown in FIG. 2, the CPU 111, the ROM 112, the RAM 113, the storage part 120 and the input/output part 114 are electrically connected to each other through a bus line 115. The input device 130 and the display device 140 are also electrically connected to the bus line 115.

The RAM 113 is a device capable of transferring and receiving data faster than the storage part 120 to and from the CPU 111. The RAM 113 reads programs and data required to be executed in the CPU 111 from a program storage area 123, a graphic data storage area 121 and a temporary storage area 122 (see FIG. 2) of the storage part 120 to store the programs and data therein.

The storage part 120 is a mass storage device including an external device such as a silicon disk drive or a hard disk drive, and is capable of storing large-sized data. The storage part 120 transfers and receives data to and from the RAM 113, as required.

The graphic data storage area 121 of the storage part 120 in this preferred embodiment stores therein the CAD data 511 (see FIG. 3) and design data 521 to be inputted through the input/output part 114 to the controller 110 of the graphic processing apparatus 100. The temporary storage area 122 stores therein data to be temporarily held in the process of searching for an outermost closed figure to be described later.

The CPU 111 is capable of executing the processes of reading and writing (or transferring) data between the RAM 113 and the storage part 120 in predetermined timed relation in accordance with programs stored in the ROM 112 and the RAM 113. Additionally, the CPU 111 is capable of executing the processes of transferring and receiving the CAD data 511, the design data 521 and the page layout data in predetermined timed relation to and from the graphic data input apparatus 510, the design data input apparatus 520 and the printing apparatus 610 electrically connected thereto through the input/output part 114 and the network 400.

Figure 3:
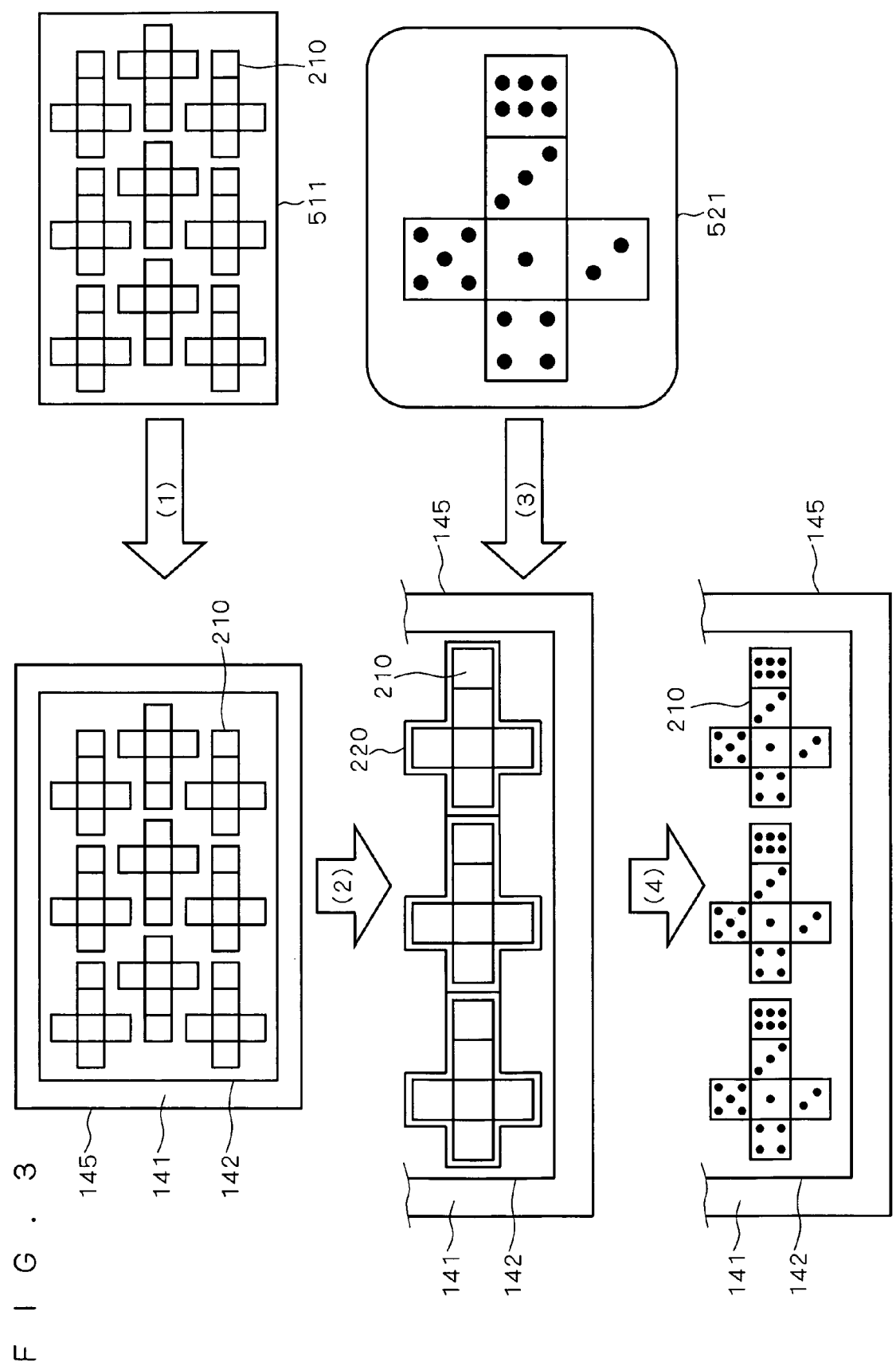
FIG. 3 illustrates an example of graphic processing executed in the graphic processing apparatus.

An example of the graphic processing executed in this preferred embodiment will be described. FIG. 3 illustrates an example of the graphic processing executed in the graphic processing apparatus 100. As shown in FIG. 3, the graphic processing apparatus 100 principally executes the process of superimposing the design data 521 on each of the developed drawings 210 in steps (1) to (4). Each of the developed drawings 210 is a developed drawing of a cube made up of six squares, as shown in FIG. 3.

In the step (1), the CAD data about the plurality of developed drawings 210 of paper containers created by the graphic data input apparatus 510 is read from the graphic data storage area 121 of the storage part 120 into the RAM 113. Then, the CAD data 511 is inserted into a printable region 142 included in a region (referred to hereinafter as a "plate region") 141 indicating the plate, and is displayed on the display screen 145.

In the step (2), a mask required in a mask process is created in accordance with a manipulation performed by the operator. The term "mask process" used herein refers to the process of defining a region located within a mask in the printable region 142 as a target region to be subjected to the graphic processing so that the remaining region is not influenced by the graphic processing. The term "mask" used herein refers to a boundary between the region to be subjected to the graphic processing and the region not to be subjected to the graphic processing. When a specific mask is designated, the predetermined graphic processing is performed only on the region defined within the mask.

A mask 220 in this preferred embodiment is created around each of the plurality of developed drawings 210 displayed in the printable region 142, and has a shape substantially geometrically similar to the contour of each developed drawing 210.

In the step (3), the design data 521 created by the design data input apparatus 520 is read from the graphic data storage area 121 of the storage part 120 into the RAM 113.

When a design is put only on the inside regions of the developed drawings 210, it is conceivable that cutting out the individual developed drawings 210 printed on the printing material by the cutting apparatus 620 along lines offset outwardly from an outline 214 (See FIG. 4) on the outer perimeter of the developed drawings 210 will result in the occurrence of a portion containing no design in the developed drawings 210 after the cutting.

In this preferred embodiment, the design is put also on a surrounding region 230 outside the outline 214 on the outer perimeter of each developed drawing 210 as shown in FIG. 4 in order that the design will be put on the entire regions in the developed drawings 210 after the cutting even if the developed drawings 210 are cut out along the lines offset outwardly from the outline 214 of the developed drawings 210. In other words, the design data 521 contains the design wider in area than each developed drawing 210 around each developed drawing 210.

In the step (4), the design data 521 is inserted into the masks 220 corresponding to the respective developed drawings 210, and is superimposed on each of the developed drawings 210. Specifically, each mask 220 is selected, and the design data 521 is inserted in only the inside of the selected mask. With attention to the orientation of each developed drawing 210, the design data is inverted, mirror-reversed or rotated through a predetermined angle about a predetermined position before the insertion in this step.

This allows the design to be put on only some of the developed drawings 210 subjected to the process of superimposing the design data 521 thereon even if the area in which the design is put in terms of the design data 521 is greater than the area of each developed drawing 210, thereby preventing the influence on other developed drawings 210.

Then, the designs are put on all of the developed drawings 210 by executing the process of superimposing the design data 521 on all of the developed drawings 210.

<3. Process of Searching for Outermost Closed Figure>

As discussed above, the process of superimposing the design data 521 on each developed drawing 210 is carried out by inserting the design data 521 into the mask 220 created around each developed drawing 210.

The mask 220 for each of the plurality of developed drawings 210 is created around a closed figure having the largest area (referred to hereinafter as an "outermost closed figure") among a plurality of closed figures formed by joining line segments together which are the graphic primitives of the corresponding developed drawing 210 and each of which is connected to its adjacent line segment at a common point (or intersection point). For this reason, it is impossible to create the mask 220 around a developed drawing 210 and to properly establish the mask 220 if the outermost closed figure does not coincide with the outline 214 (see FIG. 4) of the developed drawing 210 or if at least one of the line segments constituting the outline 214 does not intersect the remaining line segments so that the outline 214 forms an open figure. As a result, there arises a problem such that the design data 521 is not properly superimposed on the developed drawing 210.

This preferred embodiment solves this problem by executing the following operation prior to the execution of the process of creating the above-mentioned mask. The operation includes searching each developed drawing 210 for the outermost closed figure to extract the outermost closed figure from each developed drawing 210, and making a comparison by an operator between the extracted outermost closed figure and the outline of each developed drawing 210 to check whether or not the outermost closed figure coincides with the outline 214 of each developed drawing 210.

Figure 6:
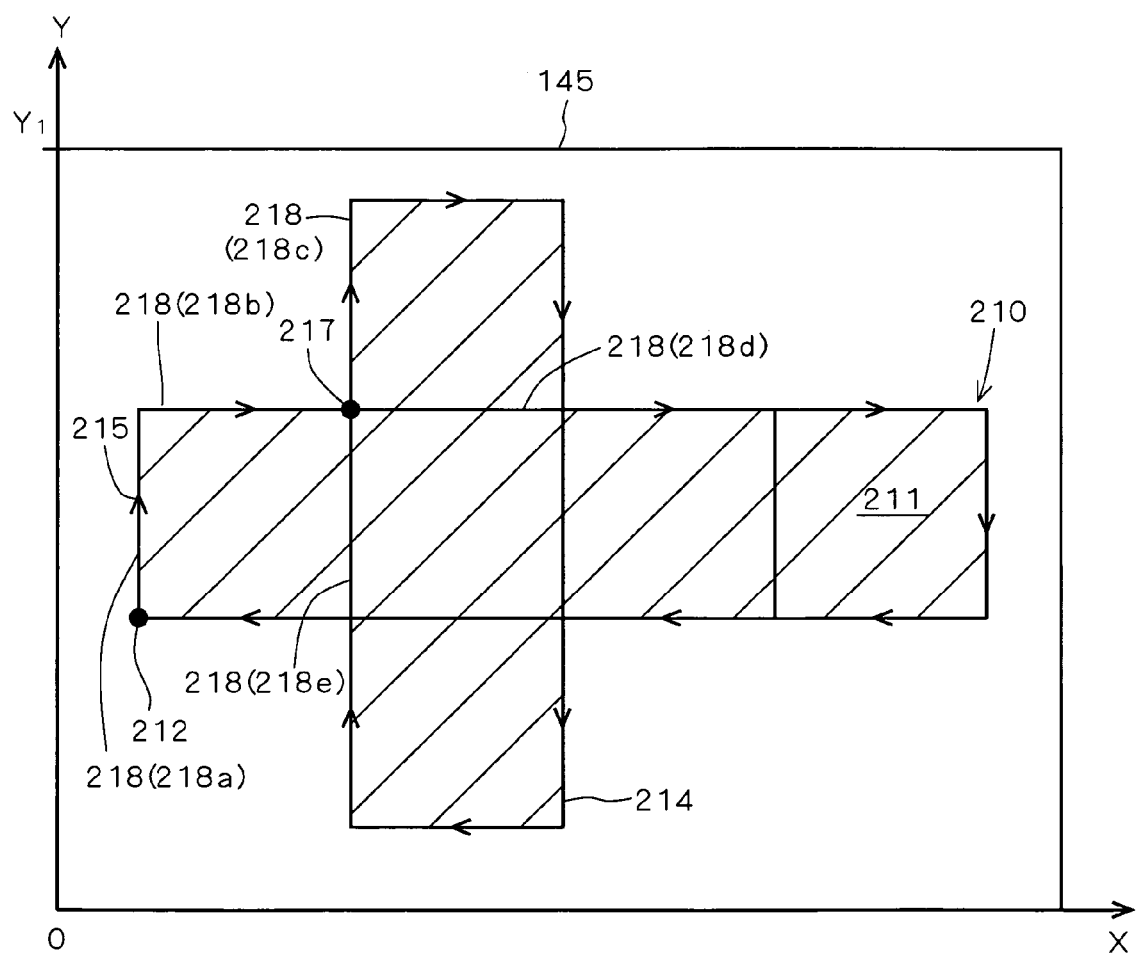
Figure 8:
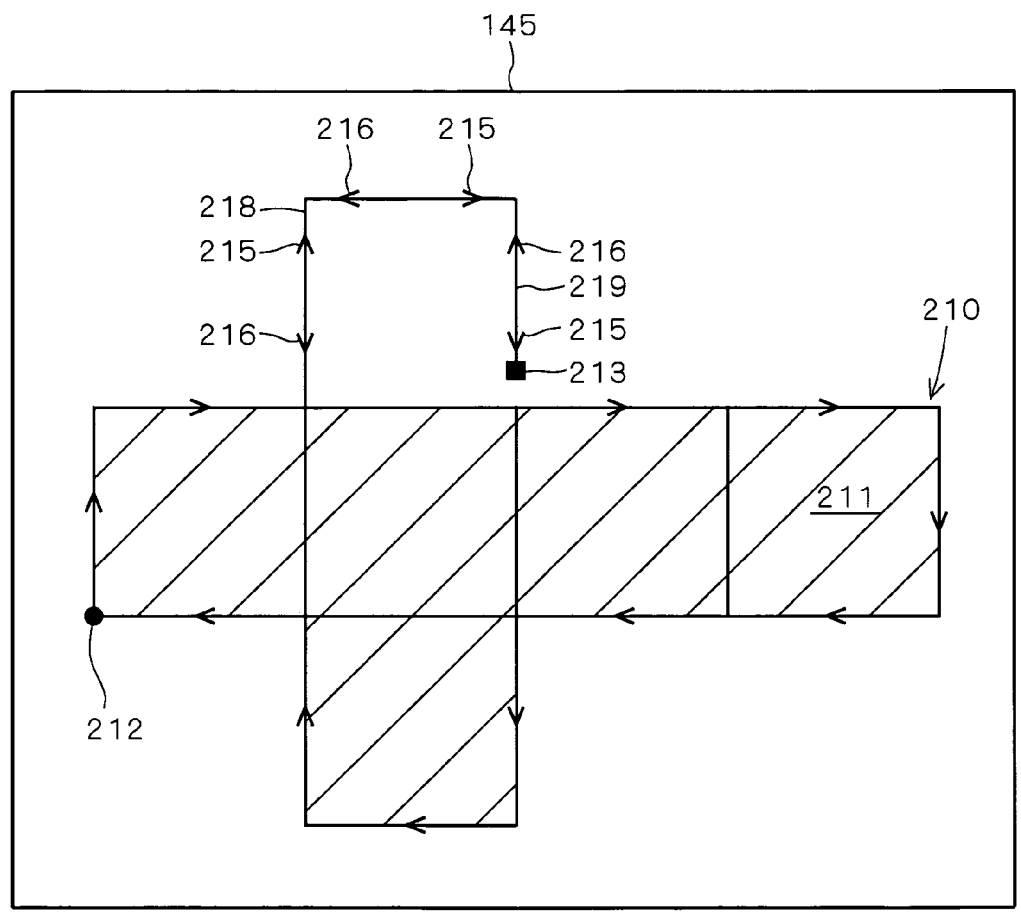

A program for executing the process of searching for the outermost closed figure to be described below is previously stored in the program storage area 123 (see FIG. 2) of the storage part 120. This program is copied from the storage part 120 to the RAM 113 at the time of execution thereof, and is executed by the CPU 111. For the execution of the searching process, a display produced on the display screen 145 is changed from an "overall display mode" in which the plurality of developed drawings 210 are displayed as shown in FIG. 3 to an "editable mode" in which one of the developed drawings 210 is displayed as shown in FIGS. 6 through 8 and in which the operator can edit the graphic primitives.

Figure 5:
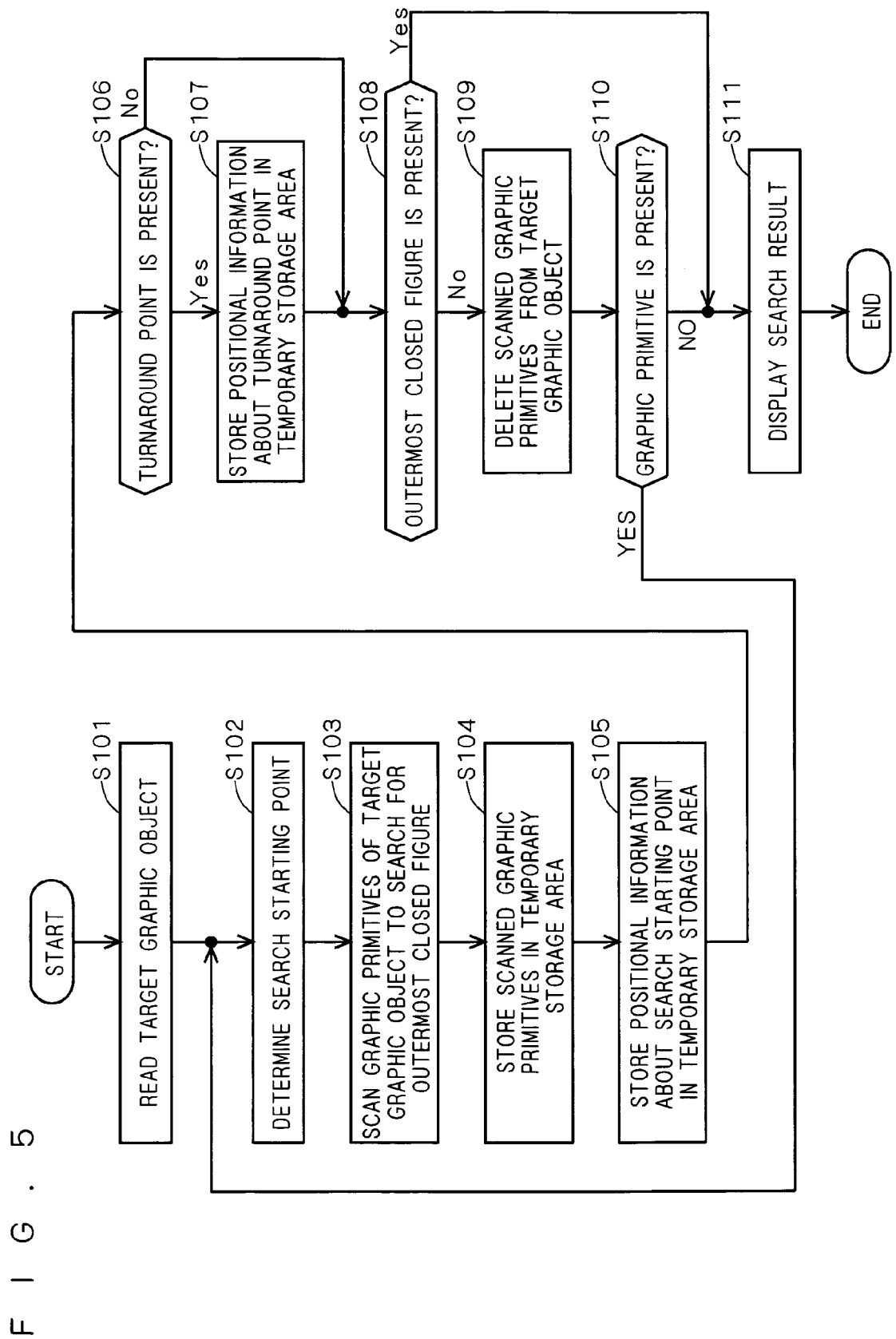
FIG. 5 is a flow chart showing a procedure for the process of searching for an outermost closed figure.

FIG. 5 is a flow chart showing a procedure for the process of extracting an outermost closed figure. FIGS. 6 through 8 illustrate the procedure for searching for the outermost closed figure. The first step of the process of searching a developed drawing 210 for an outermost closed figure is to read a developed drawing 210 to be subjected to the searching process as a target graphic object from the CAD data 511 stored in the graphic data storage area 121 of the storage part 120 (see FIG. 2) and composed of a plurality of developed drawings 210 (in Step S101).

Next, a search starting point for making a search for an outermost closed figure is determined in Step S102. Specifically, as shown in FIG. 6, Step S102 includes scanning a line segment from a point (X,Y)=(0,0) to a point (X,Y)=(0,Y1) along the Y-axis to conduct a search as to whether or not a graphic primitive (in the case of FIG. 6, a line segment) constituting the developed drawing 210 is present on the scanned line. When a graphic primitive of the developed drawing 210 is detected on the scanned line, one of the two points at opposite ends of the graphic primitive which has the smaller y-coordinate is determined as a search starting point 212 (as indicated by a solid circle in FIG. 6). When the two points at opposite ends of the graphic primitive are equal in y-coordinate to each other, one of the two points which has the smaller x-coordinate is determined as the search starting point 212.

When no graphic primitive of the developed drawing 210 is detected on the scanned line, "one" is added to the x-coordinate, and a similar process is repeated until the starting points is detected.

Next, the process of scanning along the line segments of the developed drawing 210 from the search starting point 212 determined in Step S102 to search for an outermost closed figure is performed in Step S103. In other words, the outermost closed figure is extracted in Step S103 by tracing a chain of graphic primitives of the developed drawing 210. Specifically, the line segments of the developed drawing 210 are scanned according to the following rules (A) to (D).

(A) A line segment to which the search starting point 212 belongs is scanned from the search starting point 212 toward the other end of the line segment.

(B) If a plurality of line segments intersect each other at an intersection point (e.g., three intersecting line segments 218c, 218d, 218e at an intersection point 217), the leftmost line segment (e.g., the line segment 218c at the intersection point 217) as seen in the direction of tracing is selected and scanned.

(C) If a line segment 219 intersects no other line segments and it is impossible to scan the next line segment as shown in FIGS. 7 and 8, the unconnected or dead end of the line segment 219 is regarded as a turnaround point 213, and a reverse scan from the turnaround point 213 is carried out by reversing the direction of tracing, that is, by changing the direction of tracing from a direction indicated by arrows 215 to a direction indicated by arrows 216. When an intersection point is reached for the first time after the reversal of the direction of tracing at the turnaround point 213, a line segment 218 is selected and continues to be scanned in a manner similar to the rule (B). In this manner, there arises occasions where the same line segments 218 and 219 are each scanned twice when the turnaround point 213 is present.

(D) Then, the search starting point 212 is reached again, and the scan of the line segments of the developed drawing 210 is completed.

After the completion of the process of scanning the line segments of the developed drawing 210 in Step S103, information obtained by the scan is stored in the temporary storage area 122 of the storage part 120. Specifically, graphic data about the graphic primitives scanned in Step S103 is stored in the temporary storage area 122 (in Step S104), and positional information about the search starting point 212 is stored in the temporary storage area 122 (in Step S105). When the turnaround point 213 is detected during the scan (in Step S106), positional information about the turnaround point 213 is also stored in the temporary storage area 122 (in Step S107).

In Step S108, a judgment is made as to whether or not a closed figure is composed of the line segments 218 and 219 scanned in Steps S102 to S107.

Specifically, when all of the scanned line segments 218 and 219 are scanned twice (e.g., line segments 218f and 219a in FIG. 7), it is judged that no outermost closed figure is composed of the scanned line segments 218 and 219 (in Step S108). Next, the scanned graphic primitives are deleted from the target graphic object (in Step S109). When a graphic primitive is present in the target graphic object subjected to the deletion process (in Step S110), the processing returns to Step S102, and the processes in Steps S102 to S107 are repeated anew. When no graphic primitive is present in the target graphic object subjected to the deletion process, the processing proceeds to Step S111.

When not all of the scanned line segments 218 and 219 are scanned twice (for example, as shown in FIG. 8), it is judged that an outermost closed figure is composed of the scanned line segments 218 and 219 (in Step S108), and the processing proceeds to Step S111. Thus, this preferred embodiment is capable of scanning the line segments 218 and 219 of the developed drawing 210 thereby to search for and extract the line segments (or graphic primitives) forming the outermost closed figure.

After the completion of the processes in Steps S101 to S110, a search result is displayed (in Step S111) as shown in FIGS. 6 through 8. Specifically, the search starting point 212, the arrows 215 and 216 indicating the scanning directions and, as required, the turnaround point 213 are displayed on the line segments 218 and 219 of the developed drawing 210, based on the data stored in the temporary storage area 122 of the storage part 120. When the extracted line segments 218 and 219 form a closed figure, hatching or the like is applied to the inside region 211 of the closed figure displayed on the display screen 145 of the display device 140 for discernment from other regions.

The operator can easily make the following judgment by viewing the display of the search result. When the outline 214 of the developed drawing 210 coincides with the outermost closed figure (see FIG. 6), the operator can judge that the outline 214 of the developed drawing 210 forms a closed figure. This allows the proper creation of the mask 220 (see FIG. 3) around the developed drawing 210.

On the other hand, when the outline 214 of the developed drawing 210 does not coincide with the outermost closed figure, the operator can judge that it is necessary to edit the outline 214 of the developed drawing 210 because the outline 214 forms no closed figure and it is hence impossible to properly create the mask 220 around the developed drawing 210.

The operator can easily judge which line segment is not properly connected to other line segments by observing the search starting point 212, the turnaround point 213 and the inside region 211 of the closed figure composed of the extracted line segments all of which are displayed on the display screen 145. For example, if the turnaround point 213 is present, the operator can judge that the line segment having the turnaround point 213 is not properly connected to other line segments. This enables the operator to easily correct the graphic data about the line segments, thereby causing the outline 214 of the developed drawing 210 to form the outermost closed figure.

As a result, the operator can easily find out a portion which macroscopically appears to form a closed figure but is unconnected in terms of graphic data. This significantly reduces the number of man-hours needed for graphic edit.

Then, this preferred embodiment is capable of executing the above-mentioned search process on all of the developed drawings 210 to check whether or not the respective outlines 214 are closed figures, thereby enabling the operator to edit the graphic data about the graphic primitives, as required. Therefore, the proper creation of the masks 220 for all of the respective developed drawings 210 is accomplished when the mask creation process is executed. This shortens the time required for the mask creation to improve the efficiency of operation.

<4. Advantages of Graphic Processing Apparatus of Preferred Embodiment>

As described hereinabove, the graphic processing apparatus 100 according to the preferred embodiment is capable of checking whether or not the outline 214 of each developed drawing 210 forms a closed figure. Additionally, if the outline 214 forms no closed figure, the graphic processing apparatus 100 enables the operator to easily judge which line segment is not properly connected by observing the search starting point 212, the turnaround point 213 and the inside region 211 of the closed figure composed of the extracted line segments all of which are displayed on the display screen 145. Therefore, the graphic processing apparatus 100 significantly reduces the time required to edit the graphic primitives to achieve an improvement in efficiency of the mask creation process.

<5. Modifications>

Although the preferred embodiment according to the present invention has been described above, the present invention is not limited to the above-mentioned specific form.

In the preferred embodiment described above, the CAD data and the design data are inputted using the graphic data input apparatus 510 and the design data input apparatus 520, respectively, and are then provided through the network 400 to the graphic processing apparatus 100. The present invention, however, is not limited to this. For example, the graphic processing apparatus 100 may have the function of creating the CAD data and the design data, thereby to create these data only using the graphic processing apparatus 100.

Although the line segments are described as the graphic primitives constituting the target graphic object in this preferred embodiment, the graphic primitives according to the present invention are not limited to only the line segments, but may include curves.

For the display of the search result of the outermost closed figure in this preferred embodiment, hatching or the like is applied to the inside region of the closed figure composed of the extracted line segments to display the inside region of the closed figure discernibly from other regions. The present invention, however, is not limited to this. For example, the extracted line segments may be displayed in a different color and/or with a different thickness from other line segments.

In the process of searching for the outermost closed figure, the graphic data about the scanned graphic primitives, the positional information about the search starting point 212, and the positional information about the turnaround point 213 are stored in the temporary storage area 122 of the storage part 120 according to the preferred embodiment. The present invention, however, is not limited to this. A temporary storage area may be reserved in the RAM 113 to store all or some of the graphic data and the positional information therein if storage capacity permits.

While the invention has been described in detail, the foregoing description is in all aspects illustrative and not restrictive. It is understood that numerous other modifications and variations can be devised without departing from the scope of the invention.

What is claimed is:

1. A graphic processing apparatus for performing a predetermined process on a target graphic object, comprising:
   (a) an input element for inputting said target graphic object composed of CAD data combining a plurality of graphic primitives of curve lines or line segments, having positional information about its starting point and its ending point;
   (b) an extraction element for searching said target graphic object for a graphic primitive forming an outermost closed figure to extract said graphic primitive from said target graphic object by scanning along said graphic primitive forming said target graphic object; and
   (c) a display element for displaying said graphic primitive forming said outermost closed figure extracted by said extraction element discernibly from other graphic primitives forming said target graphic object so that connection status of outlines of said target graphic object is displayed.

2. The graphic processing apparatus according to claim 1, wherein
   said display element displays a region of said target graphic object surrounded by said outermost closed figure discernibly from other regions.

3. The graphic processing apparatus according to claim 2, wherein
   said extraction element traces a chain of graphic primitives to extract said graphic primitive forming said outermost closed figure, and
   said display element displays said extracted graphic primitive in a different color from other graphic primitives of said target graphic object.

4. The graphic processing apparatus according to claim 3, wherein
   said extraction element traces a chain of said graphic primitives to extract said graphic primitive forming said outermost closed figure, and
   said display element displays said extracted graphic primitive with a different thickness from other graphic primitives of said target graphic object.

5. The graphic processing apparatus according to claim 4, wherein
   said display element displays on said target graphic object a search starting point used during the search for said graphic primitive by said extraction element.

6. The graphic processing apparatus according to claim 5, wherein
   said display element displays on said target graphic object a turnaround point used during the search for said graphic primitive by said extraction element.

7. A graphic processing apparatus for placing a plurality of target graphic objects within a printable region and for creating a mask corresponding to each of said target graphic objects, comprising:

(a) an input element for inputting said plurality of target graphic objects composed of CAD data combining a plurality of graphic primitives of curve lines or line segments, each having positional information about its starting point and its ending point;

(b) an extraction element for searching a selected one of said plurality of target graphic objects for a graphic primitive forming an outermost closed figure to extract said graphic primitive from said selected target graphic object by scanning along said graphic primitive forming said target graphic object; and (c) a display element for displaying said graphic primitive forming said outermost closed figure extracted from said selected target graphic object by said extraction element discernibly from other graphic primitives forming said target graphic object so that connection status of outlines of said target graphic object is displayed.

8. A storage medium storing a computer-readable program, said program causing a computer to perform the steps of:

(a) inputting a target graphic object composed of CAD data that is a combination of a plurality of graphic primitives of curve lines or line segments each having positional information about its starting point and its ending point to store said target graphic object in a storage part of said computer;

(b) searching said target graphic object stored in said storage part for a graphic primitive forming an outermost closed figure to extract said graphic primitive from said target graphic object by means of a computation part of said computer by scanning along said graphic primitive forming said target graphic object; and (c) displaying on said display part a connection status of outlines of said target graphic object by displaying said graphic primitive extracted from said target graphic object forming said outermost closed figure in said step (b) discernibly from other graphic primitives forming said target graphic object.

9. A method of performing a predetermined graphic process on a target graphic object, comprising the steps of:

(a) inputting said target graphic object composed of CAD data that is a combination of a plurality of graphic primitives of curve lines or line segments having positional information about its starting point and its ending point;

(b) searching said target graphic object for a graphic primitive forming an outermost closed figure to extract said graphic primitive from said target graphic object by scanning along said graphic primitive forming said target graphic object; and (c) displaying a connection status of outlines of said target graphic object by displaying said graphic primitive extracted from said target graphic object forming said outermost closed figure in said step (b) discernibly from other graphic primitives forming said target graphic object.

* * * * *